(12) United States Patent
Amm et al.

(10) Patent No.: US 7,359,106 B1
(45) Date of Patent: Apr. 15, 2008

(54) DIFFRACTIVE LIGHT MODULATOR HAVING CONTINUOUSLY DEFORMABLE SURFACE

(75) Inventors: David T. Amm, Sunnyvale, CA (US); Alexander P. Payne, Ben Lomond, CA (US); James A. Hunter, Campbell, CA (US)

(73) Assignee: Silicon Light Machines Corporation, San Jose, CA (US)

( * ) Notice: Subject to any disclaimer, the term of this patent is extended or adjusted under 35 U.S.C. 154(b) by 168 days.

(21) Appl. No.: 11/230,874

(22) Filed: Sep. 20, 2005

Related U.S. Application Data

(60) Provisional application No. 60/611,591, filed on Sep. 21, 2004.

(51) Int. Cl.
*G02B 26/00* (2006.01)
(52) U.S. Cl. .................................. 359/291; 359/290
(58) Field of Classification Search ............... 359/237, 359/238, 240, 242, 245, 246, 247, 290, 291, 359/292, 293
See application file for complete search history.

(56) References Cited

U.S. PATENT DOCUMENTS

| | | | | |
|---|---|---|---|---|
| 5,471,341 | A | * | 11/1995 | Warde et al. ............... 359/293 |
| 5,949,570 | A | * | 9/1999 | Shiono et al. ............... 359/291 |
| 6,215,579 | B1 | | 4/2001 | Bloom et al. |
| 6,268,952 | B1 | | 7/2001 | Godil et al. |
| 6,445,502 | B1 | | 9/2002 | Islam et al. |
| 6,801,354 | B1 | * | 10/2004 | Payne et al. ............... 359/291 |
| 7,123,397 | B2 | * | 10/2006 | Murakami ............... 359/224 |
| 2002/0021485 | A1 | * | 2/2002 | Pilossof ............... 359/295 |
| 2003/0035215 | A1 | | 2/2003 | Amm et al. |

OTHER PUBLICATIONS

Corrigan, Robert, et al. "Silicon Light Machines—Grating Light Valve Technology Brief", Jun. 2001, pp. 1-8; Silicon Light Machines, Sunnyvale, California.

(Continued)

*Primary Examiner*—Timothy Thompson
(74) *Attorney, Agent, or Firm*—Okamoto & Benedicto LLP

(57) ABSTRACT

A light modulator and a method of manufacturing the same are provided having a continuously deformable optical surface. Generally, the modulator includes a substrate, a membrane disposed above and spaced apart from an upper surface of the substrate, the membrane having a continuously deformable light reflective surface formed on its upper side facing away from the upper surface of the substrate, and a means for deflecting the deformable surface relative to the substrate. Light reflected from different points of the deformable surface can interfere to modulate light reflected from the modulator in $0^{th}$ order applications. In one embodiment, the membrane includes a static reflective surface surrounding the deformable surface. Light reflected from the static surface and the deformable surface can interfere to modulate light reflected from the modulator in non-$0^{th}$ order applications. Preferably, the static surface is substantially planar and the deformable surface are sized and shaped to define substantially equal areas. In one embodiment, the static surface circumscribes the deformable surface to define a parabolic reflector.

14 Claims, 17 Drawing Sheets

OTHER PUBLICATIONS

Amm, D.T., et al. "Grating Light Valve Technology: Update and Novel Applications" May 19, 1998, pp. 1-4; Presented at Society for Information Display Symposium, Anaheim, California.

Amm, David T., et al. "Optical Performance of the Grating Light Valve Technology" 1999, pp. 1-8; Silicon Light Machines, Sunnyvale, California.

Corrigan, R.W., et al. "An Alternative Architecture for High Performance Display" Nov. 20, 1999, pp. 1-5; Presented at the 141st SMPTE Technical Conference and Exhibition, New York, NY.

Bloom, D.M., et al. "The Grating Light Valve: revolutionizing display technology" 1997, pp. 1-10; Silicon Light Machines, Sunnyvale, California.

Corrigan, R.W., et al. "Calibration of a Scanned Linear Grating Light Valve™ Projection System", May 18, 1999, pp. 1-4; Presented at Society for Information Display Symposium, San Jose, California.

* cited by examiner

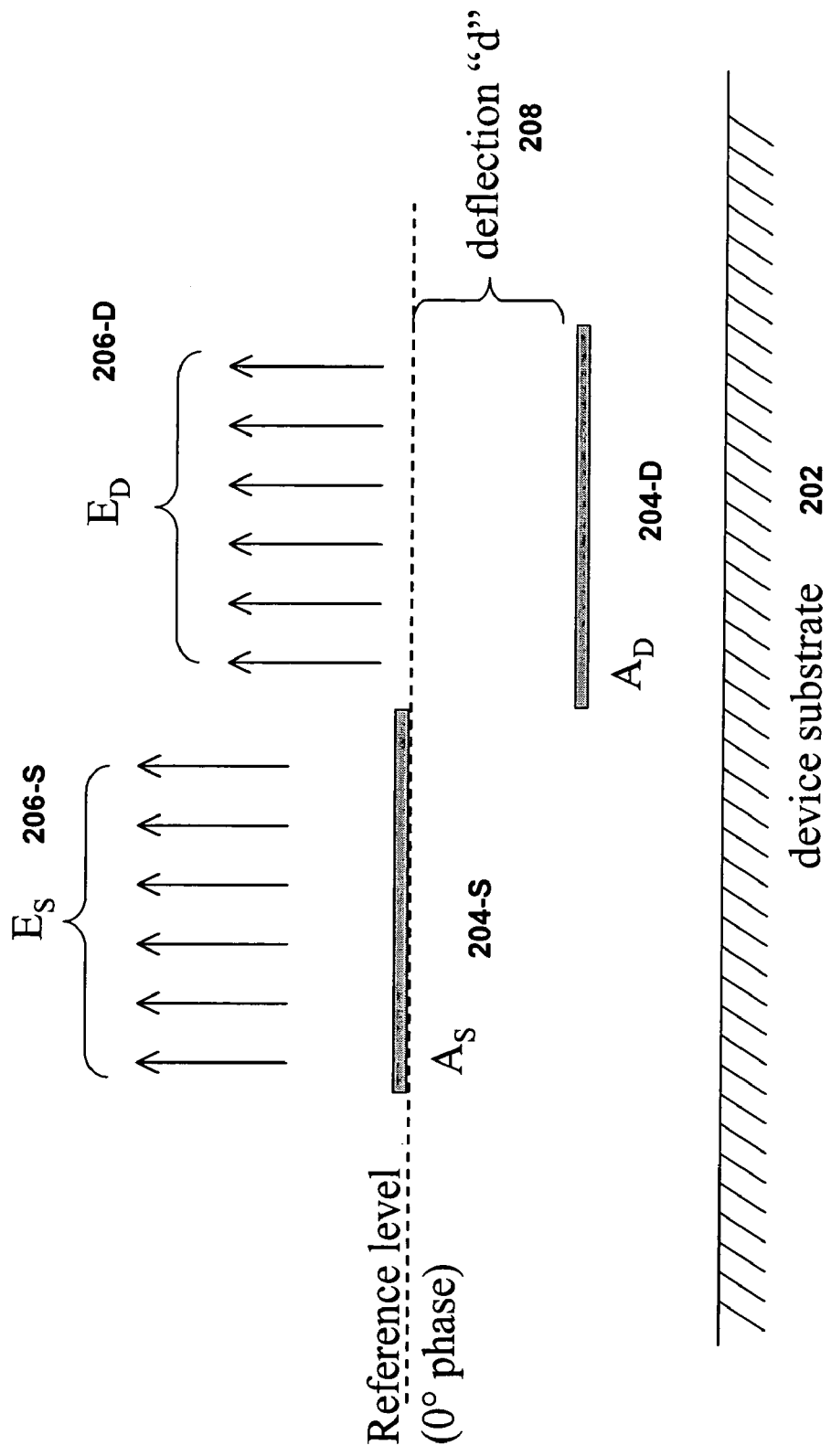
FIG. 2
(Conventional)

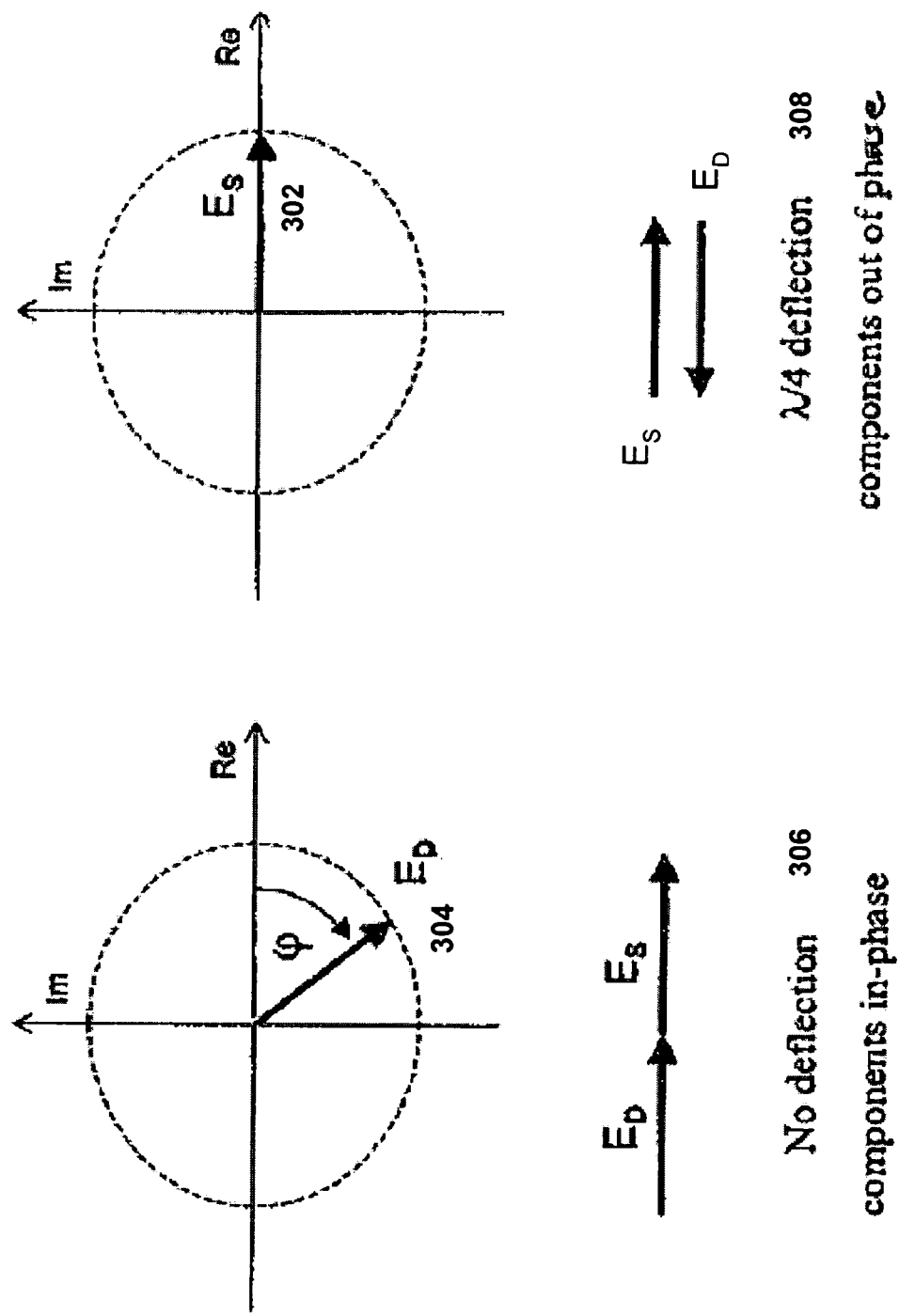
FIG. 3
(Conventional)

DIFFRACTIVE LIGHT MODULATOR HAVING CONTINUOUSLY DEFORMABLE SURFACE

CROSS-REFERENCE TO RELATED APPLICATIONS

The present application claims the benefit of U.S. provisional application No. 60/611,591, entitled "Continuously Deformable Surfaces for Diffractive Light Modulators," filed Sep. 21, 2004, by inventors David T. Amm, Alexander P. Payne, and James A. Hunter. The disclosure of the aforementioned U.S. provisional application is hereby incorporated by reference in its entirety.

TECHNICAL FIELD

The present invention relates generally to spatial light modulators, and more particularly to diffractive spatial light modulators and methods for manufacturing and operating the same.

BACKGROUND OF THE INVENTION

Spatial light modulators (SLMs) are devices or arrays of one or more devices that can control or modulate an incident beam of light in a spatial pattern that corresponds to an electrical input to the devices. The incident light beam can be modulated in intensity, phase, polarization or direction.

Some modulation can be accomplished through the use of Micro-Electromechanical System devices or MEMS that use electrical signals to move micromechanical structures to modulate light incident thereon. MEMS-based optical modulator devices generally require that pixels have flat optical surfaces that can be either tilted or displaced (vertical piston for example) in order to modulate light.

SUMMARY

In one aspect, the present disclosure is directed to a diffractive modulator or diffractor for modulating light incident thereon. Generally, the diffractive modulator includes a substrate having an upper surface, a membrane disposed above the upper surface of the substrate and in spaced apart relation thereto, the membrane including a continuously deformable light reflective surface formed on its upper side facing away from the upper surface of the substrate, and circuitry for controllably deflecting the deformable surface relative to the upper surface of the substrate. The circuitry for controllably deflecting the deformable surface may include, for example, circuitry for applying an electrostatic force between the substrate and the deformable surface.

In accordance with the present disclosure, light reflected from different points or areas of the deformable surface interfere to modulate light reflected from the diffractive modulator in $0^{th}$ order applications.

In one embodiment, the membrane further includes a static light reflective surface surrounding the deformable surface. Light reflected from the static surface and the deformable surface can interfere to modulate light reflected from the diffractive modulator in non-$0^{th}$ order applications. In one version of this embodiment, the membrane is supported above the upper surface of the substrate by a wall extending substantially entirely around the deformable surface to define a cavity there beneath, and the static surface is formed on a portion of the membrane abutting a top surface of the wall.

Preferably, the static surface and the deformable surface are sized and shaped to define substantially equal areas. More preferably, the static surface is substantially planar.

In one embodiment, the static surface circumscribes the deformable surface to define a parabolic reflector.

In another embodiment, the deformable surface includes a plurality of ring shaped regions concentric with and separated by a plurality of ring shaped regions of the static surface to form a Fresnel mirror.

In yet another embodiment, the deformable surface includes a plurality of rectangular shaped regions parallel with and separated by a plurality of rectangular shaped regions of the static surface to form a linear array.

Optionally, the static surface includes a raised portion raised above a reference plane of the deformable surface in a quiescent state. The two surfaces are separated by a distance, d, between 0 and $n*\lambda/4$, where $\lambda$ is a wavelength of the light incident on the diffractive modulator, and n is an integer equal to or greater than 1. In one version of this embodiment, d is selected to provide a separation between the raised portion of the static light reflective surface and the plane of the deformable surface in a quiescent state such that the diffractive modulator is in a substantially "OFF" state when the deformable surface is not deflected. Alternatively, d is selected to provide a separation between the raised portion of the static light reflective surface and the plane of the deformable surface in a quiescent state such that the diffractive modulator is in a substantially "ON" state when the deformable surface is not deflected.

In yet another embodiment, the static surface further includes a 0° phase surface between the raised portion of the static light reflective surface and the deformable surface, the 0° phase surface substantially co-planer with the plane of the deformable surface in a quiescent state.

It may be appreciated that the diffractive modulators of the present invention is particularly useful in a spatial light modulator (SLM) including an array of a number of such diffractive modulators, where the SLM further includes a number of pixels, each pixel including at least one diffractive modulators.

In another aspect, the present disclosure is also directed to a method of fabricating diffractive modulator such as that described above. Generally, the method includes the steps of: (i) depositing a sacrificial layer onto an upper surface of an electrically active substrate; (ii) forming a membrane on the sacrificial layer by depositing a layer of elastic material thereon; (iii) forming an etch hole extending through the membrane from an upper surface thereof to the lower surface; (iv) removing a portion of the sacrificial layer through the etch hole to partially release the membrane from the substrate and define a cavity there beneath, thereby forming a continuously deformable portion of the membrane disposed above the upper surface of the substrate and in spaced apart relation thereto; (v) depositing a reflective material on an upper surface of the membrane, the reflective material substantially filling and closing the etch hole; and (vi) planarizing and polishing the reflective material to form a continuously deformable light reflective surface formed on the upper surface of the continuously deformable portion of the membrane facing away from the upper surface of the substrate.

Preferably, the elastic material is an electrically insulating material and the reflective material is a conductive material, and the step of depositing the reflective material on the upper surface of the membrane further includes the step of forming a membrane electrode.

More preferably, the sacrificial layer includes polysilicon, and the step of removing a portion of the sacrificial layer through the etch hole uses an etchant gas comprising Xenon Difluoride (XeF$_2$) for a predetermined time to tailor a size of the cavity and the continuously deformable portion of the membrane.

In one embodiment, the step of planarizing and polishing the reflective material further includes the step of forming a static light reflective surface surrounding the continuously deformable light reflective surface. Optionally, the step can further involve forming a static light reflective surface having a raised portion circumscribing the continuously deformable light reflective surface. As noted above, the raised portion is raised above a reference plane which is the plane of the continuously deformable light reflective surface in a quiescent state, and separated therefrom by a distance, d, between 0 and n*λ/4, where λ is a wavelength of the light incident on the diffractive modulator, where n is an integer equal to or greater than 1.

In yet another version of this embodiment, the step of forming a static light reflective surface further includes the step of forming a 0° phase surface between the raised portion of the static light reflective surface and the continuously deformable light reflective surface, the 0° phase surface substantially co-planer with the plane of the continuously deformable light reflective surface in a quiescent state.

BRIEF DESCRIPTION OF THE DRAWINGS

These and various other features and advantages of the present invention may be apparent upon reading of the following detailed description in conjunction with the accompanying drawings and the appended claims provided below, where:

FIG. 2 is a partial cross-sectional side view of a conventional diffractive modulator of a SLM illustrating displacement of one of two planar optical surfaces relative to a device substrate;

FIG. 3 shows phasor diagrams of the output of the diffractive modulator of FIG. 2 illustrating an "on" and an "off" state;

DETAILED DESCRIPTION

Basic Theory

Figure 1:
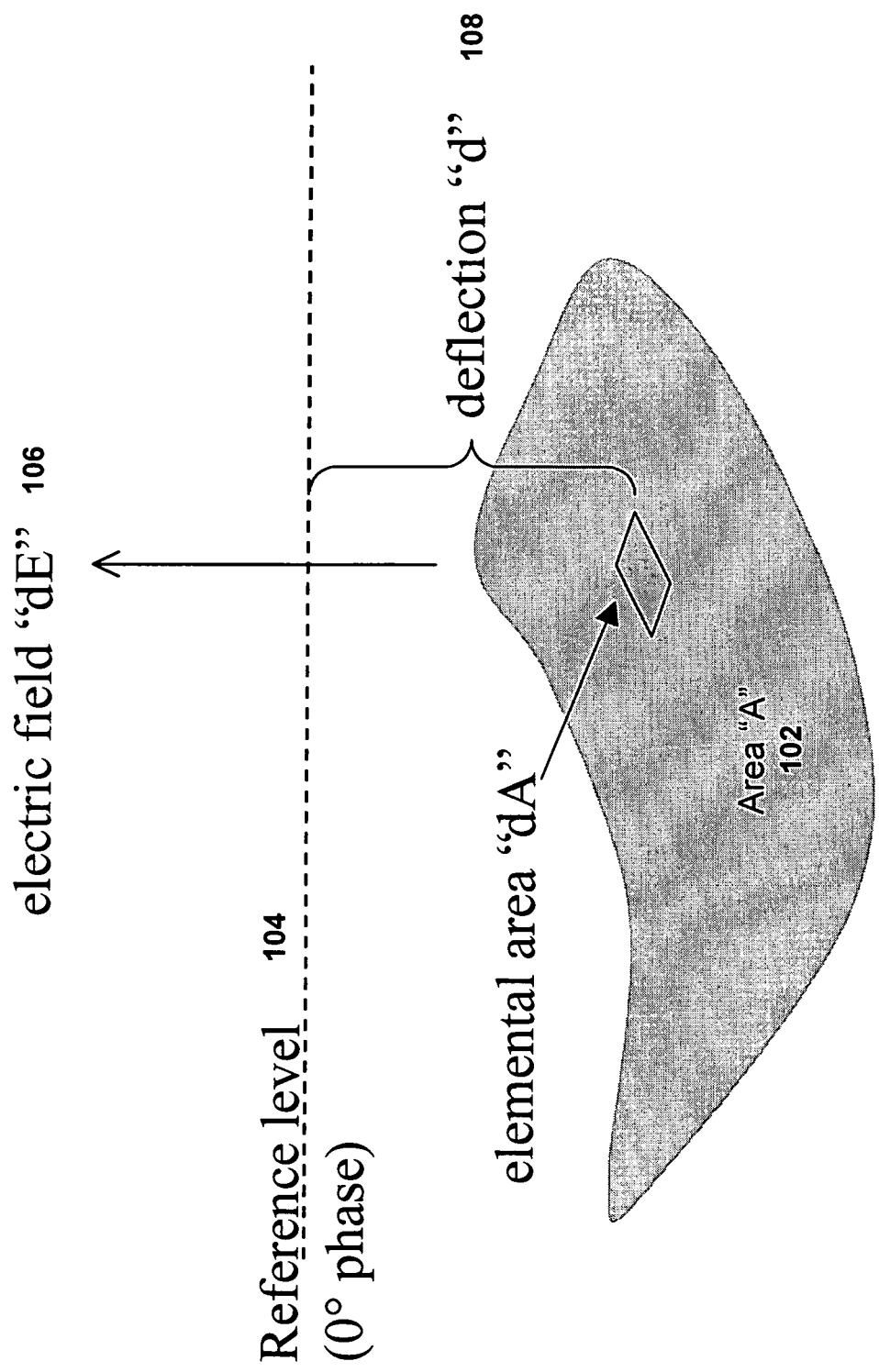
FIG. 1 is a functional diagram of a non-planar area or cell of a diffractive modulator of a spatial light modulator (SLM)

The basic theory of a reflective, diffractive modulator having a non-planar area or cell 102 is now described with reference to FIG. 1. This area 102 may be arrayed to create a periodic array. In other words, this area may be considered a part of, or an entire pixel in a modulator array.

In general, each differential element, dA, of this area 102 may be deflected some distance, d, (either static, or through electrostatic deflection) 108 from a planar reference surface 104. Each element dA may propagate an electric field proportional to the square root of the incident intensity and the surface reflectivity.

Assuming uniform illumination and uniform reflectivity, each element dA would propagate the same magnitude of electric field, but the reflected phases (i.e. the phases of light reflected from the non-planar area 102) may differ depending upon the difference in reflected path length. Thus, the electric field 106 from each elemental area 102 may be written as shown in Equation 1 (in the far field, for normal incidence, and for the 0$^{th}$ order reflection).

$$d\tilde{E}=|dE|\cdot e^{j\phi} \propto \sqrt{I\cdot R}\cdot dA\cdot e^{j(4\pi d/\lambda)} \quad \text{(Equation 1)}$$

The total specular reflection electric field component (0$^{th}$ order diffraction) may be calculated for area A, by integrating over that area. Ignoring constants such as the uniform intensity and reflectivity, the following equation results.

$$\tilde{E}_A \approx \int e^{j(4\pi d/\lambda)} dA \quad \text{(Equation 2)}$$

In other words, the total complex electric field is calculated by integrating the phase factor over the area. The intensity is required in order to determine the efficiency of periodic structure, and the intensity is proportional to the magnitude of the square of the total electric field, as shown below in Equation 3.

$$I_A \propto |\tilde{E}_A|^2 \approx |\int e^{j(4\pi d/\lambda)} dA|^2 \quad \text{(Equation 3)}$$

Ribbon Light Modulators

One type of SLM is a ribbon light modulator, such as a Grating Light Valve (GLV™) which is commercially available from Silicon Light Machines Corporation, of Sunnyvale, Calif. Referring to FIG. 2, the GLV™ includes at least two ribbons 204 each having a light reflective surface supported over a surface of a substrate 202.

Generally, the light reflective surfaces of each ribbon 204 are planar surfaces of equal area, A. One surface ($A_S$) 204-S is static, typically taken to be located a the reference plane (i.e., 0° phase), while the other "active" surface ($A_D$) 204-D is electrostatically deflected by a variable distance "d" 208 towards the substrate 202 by integrated drive electronics formed in or on the surface of the substrate 202.

The integrals in Equations 2 and 3 become summations for two planar surfaces. Hence, the total specular reflection electric field from the two ribbons becomes as follows.

$$\tilde{E}_A \approx E_S + E_D \cdot e^{j(4\pi d/\lambda)} \quad \text{(Equation 4)}$$

where $E_S$ 206-S represents the amplitude from the static ribbon surface, and $E_D$ 206-D represents the amplitude from the deflected ribbon surface.

With equal areas for static and deflected surfaces, equal reflectivity, and uniform illumination, then the amplitudes $E_S$ and $E_D$ become equal (and may be referred to as simply E). The reflected intensity from the total area of the two ribbons may then be written as:

$$I_A \propto 2E^2 + 2E^2 \cdot \cos(4\pi d/\lambda) \quad \text{(Equation 5)}$$

The operation of the GLV™ may best be understood by considering phasor diagrams, shown in FIG. 3, and looking and the electric field components from the static and deflecting surfaces on Real/Imaginary axes.

Referring to FIG. 3, the electric field due to the static surface 302 is fixed in amplitude and phase (along the Real or "Re" axis). The electric field from the deflecting surface 304 is fixed in amplitude (equal area, and remains planar), but the phase is a function of the deflection. The deflected component can essentially be adjusted to give any desired phase.

Usually, the device is operated from no deflection, up to a deflection equal to a quarter wavelength of light, ¼. For no deflection 306, all surfaces are in phase, and the electric field components add—this is the "ON" state of a device (operating in $0^{th}$ order). For ¼ deflection 308, the phase difference becomes 180°, and the two electric field components cancel completely.

Note that the ideal GLV™ device described here is assumed to be "perfect". That is, the device has an "ON" state which reflects all incident light (high efficiency), and an "OFF" state that completely extinguishes the $0^{th}$ order (high contrast). Of course, actual devices are not perfect.

Limitations and Drawbacks to Ribbon Light Modulators

Although, an improvement over previous generations of SLMs alone, the above ribbon light modulator or GLV™ is not wholly satisfactory for many applications requiring high or very high resolution, such as leading edge semiconductor processing, for a number of reasons.

Fundamentally, conventional ribbon light modulators inherently provide a low optical efficiency since only a substantially flat, planar portion away from supporting regions can be used to modulate light as described above. Moreover, since even the central portions of the ribbons are not truly planar, contrast achievable using conventional ribbon-type SLMs is compromised or reduced.

Finally and more significantly, the flatness restriction creates significant complexity for the MEMS device design and in particular, its fabrication. Stress must be controlled in suspended films in order that they remain flat, and mechanical actuators must be buried and polished flat. This additional complexity causes decreased yields, increased cost, limited array sizes and potential reliability issues.

Spatial Light Modulator Having Continuously Deformable Optical Surface

The present disclosure is directed to a spatial light modulator (SLM) having a continuously deformable optical surface and a method of manufacturing and operating the same. The continuously deformable optical surface may be advantageously utilized to overcome the above-described limitations and drawbacks.

Spatial light modulators having a continuously deformable surface according to the present invention is now be described with reference to FIGS. 4 through 16. For purposes of clarity, many of the details of SLMs that are widely known and are not particularly relevant to the present disclosure have been omitted from the following description.

In accordance with an embodiment of the invention, a non-planar deforming membrane that may be deformed or deflected to form a parabolic revolution is now described in detail with reference to FIGS. 4 through 6.

Figure 4:
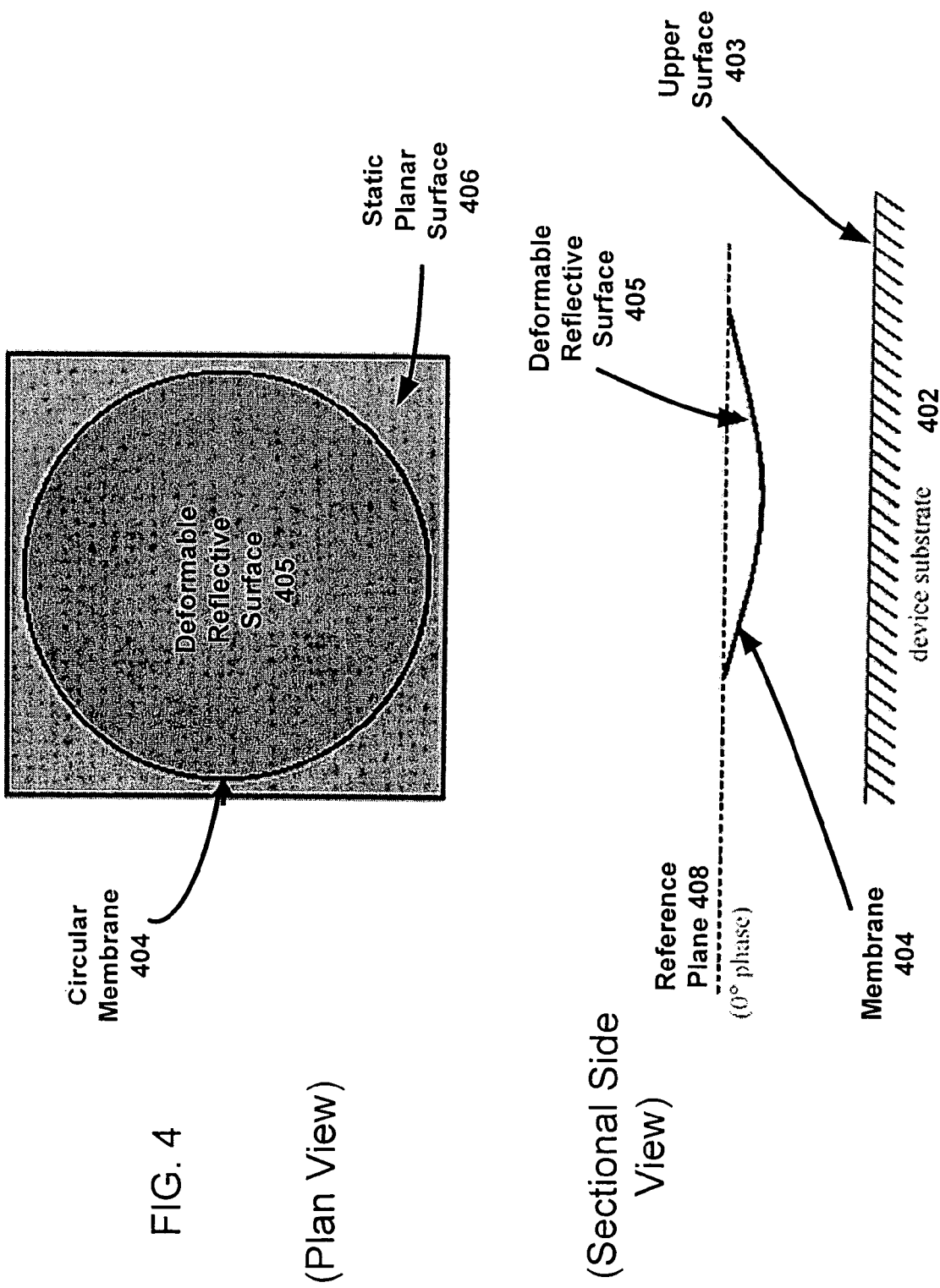
FIG. 4 shows a planar top view and a sectional side view of a parabolic diffractive modulator having a membrane with a continuously deformable optical surface circumscribed by a static planar surface according to an embodiment of the present invention.

FIG. 4 shows a plan view and a sectional side view of a diffractive modulator having a continuously deformable surface according to an embodiment of the present invention. The diffractive modulator includes a substrate 402 having an upper surface 403, a membrane 404 disposed above the upper surface 403 of the substrate 402 and spaced apart in relation thereto, the membrane 404 including a continuously deformable light reflective or optical surface 405 formed on its upper side facing away from the upper surface 403 of the substrate 402, and electronically-controllable means for deflecting the deformable surface 405 relative to the upper surface 403 of the substrate 402. The membrane may be connected to and supported by a circumferential static planar surface 406.

When undeflected, the deformable surface 405 lies in a reference (zero degrees) plane 408. The means for deflecting the deformable surface 405 may include, for example, circuitry for applying an electrostatic force between the substrate 402 and the circular membrane 404. Light reflected from different points or areas of the deformable surface 405 may interfere to modulate light reflected from the diffractive modulator in $0^{th}$ order applications.

Figure 5:
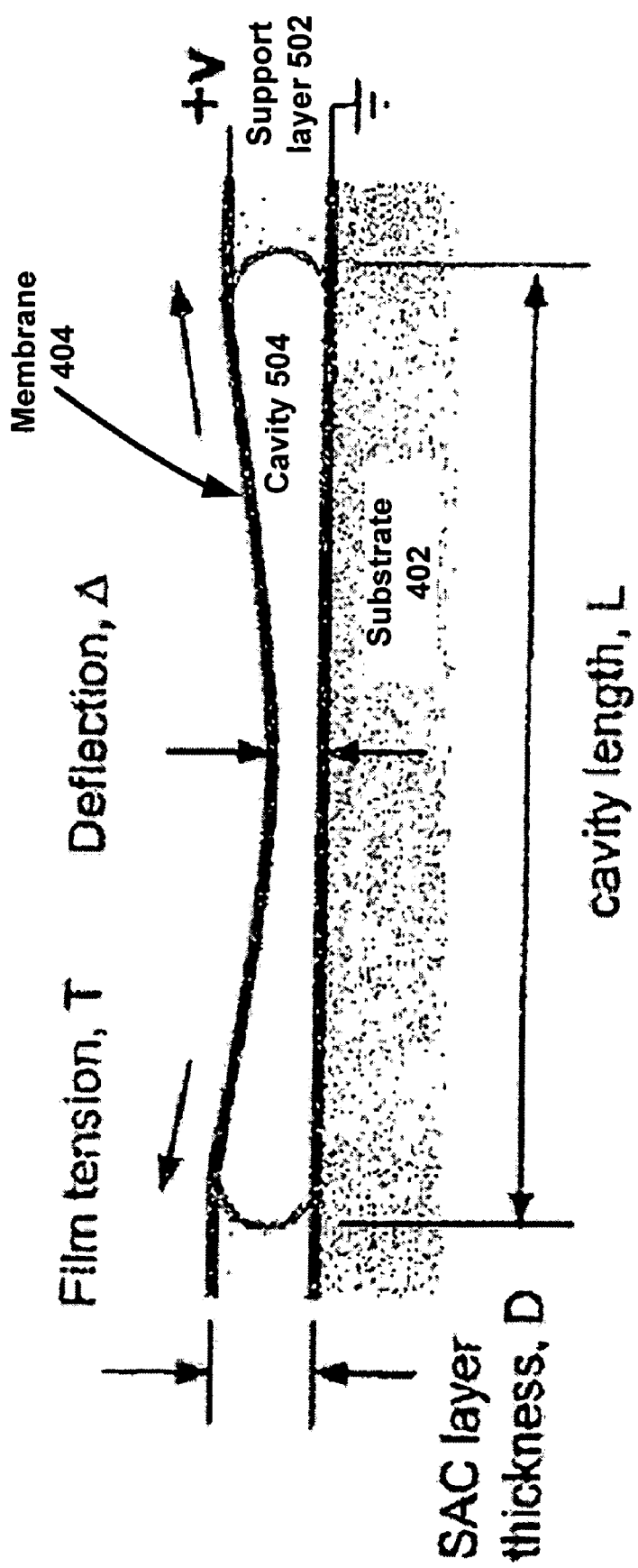
FIG. 5 is a functional diagram showing operation of a diffractive modulator having a continuously deformable optical surface according to an embodiment of the present invention.

A functional diagram showing operation of a diffractive modulator according to an embodiment of the present invention is shown in FIG. 5. FIG. 5 shows a cross-sectional view of the modulator device. In addition, to the substrate 402 and the membrane 404, a support layer 502 and a cavity 504 is depicted. The cavity 504 may be formed by selective etching of the support (sacrificial) layer 502 in the region positioned beneath the deformable membrane 404. The support (sacrificial) layer thickness may be represented by D and the cavity length may be represented by L. The membrane 404 is shown under a deflection, Δ. The deflection causes a film tension T. In this case, the deflection may be performed by applying a voltage +V to the membrane 404 while holding the substrate surface at ground.

Figure 6:
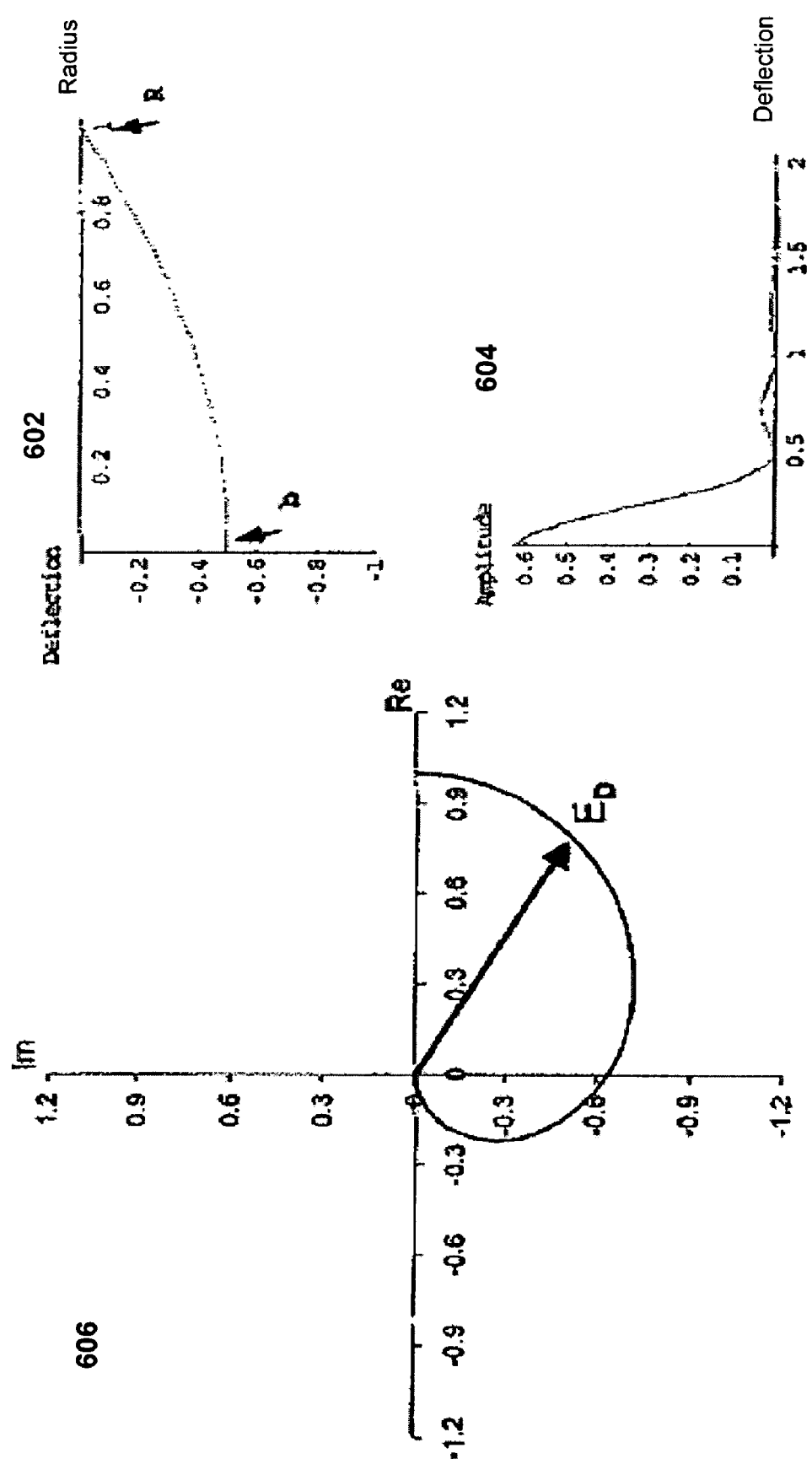
FIG. 6 shows a number of graphs illustrating: (i) deflection of a parabolic membrane, (ii) amplitude of reflection versus deflection of the membrane for the 0$^{th}$ order, and (iii) a phasor diagram for a diffractive modulator of a SLM according to an embodiment of the present invention.

FIG. 6 shows a number of graphs illustrating: (i) deflection 602 of a parabolic membrane, (ii) amplitude of reflection 604 versus deflection of the membrane for the $0^{th}$ order, and (iii) a phasor diagram 606 for the diffractive modulator of FIG. 4. Referring to the deflection 602 of FIG. 6, in many cases a thin deforming membrane can be approximated by parabolic revolution.

Calculating the net reflected electric field (the amplitude of reflection 604) from such a structure results in electric field phasors as shown in the phasor diagram 606 of FIG. 6. Here, the magnitude of the electric field (shown by the length of the vector $E_D$ in the phasor diagram 606) has been normalized to the undeflected case (such that the length is 1.0 in the undeflected case where the phasor lies along the positive real axis). In the undeflected case, the electric field is maximum since all areas are in phase.

As the membrane is deflected, a range of phases is produced from various parts of the parabola, and the net sum reduces the magnitude, and changes the net phase. When the center of the parabola is deflected to $\lambda/4$, the net phase has changed by 90° (along the negative imaginary axis) and the electric field magnitude is reduced to 64% of maximum. Coincidentally, as the center deflection is increased to $\lambda/2$, the amplitude reduces to zero.

A good diffractive modulator (operating in $0^{th}$ order) requires a state where much of the electric field is reflected in phase with maximum amplitude, and also requires a state where the $0^{th}$ order light is nulled out, as can be shown by the vector summation. As seen in FIG. 6, a parabolically deformed membrane may be configured to provide the core of such a good diffractive modulator without a static reference surface. In particular, the phasor diagram 606 in FIG. 6 shows an in-phase state at zero deflection (phasor along positive real axis), and a null state at a center deflection of $\lambda/2$ (phasor of length zero). However, such an embodiment without a static reference surface may not be easily configured with the circular membranes dense-packed into a square array.

Figure 7:
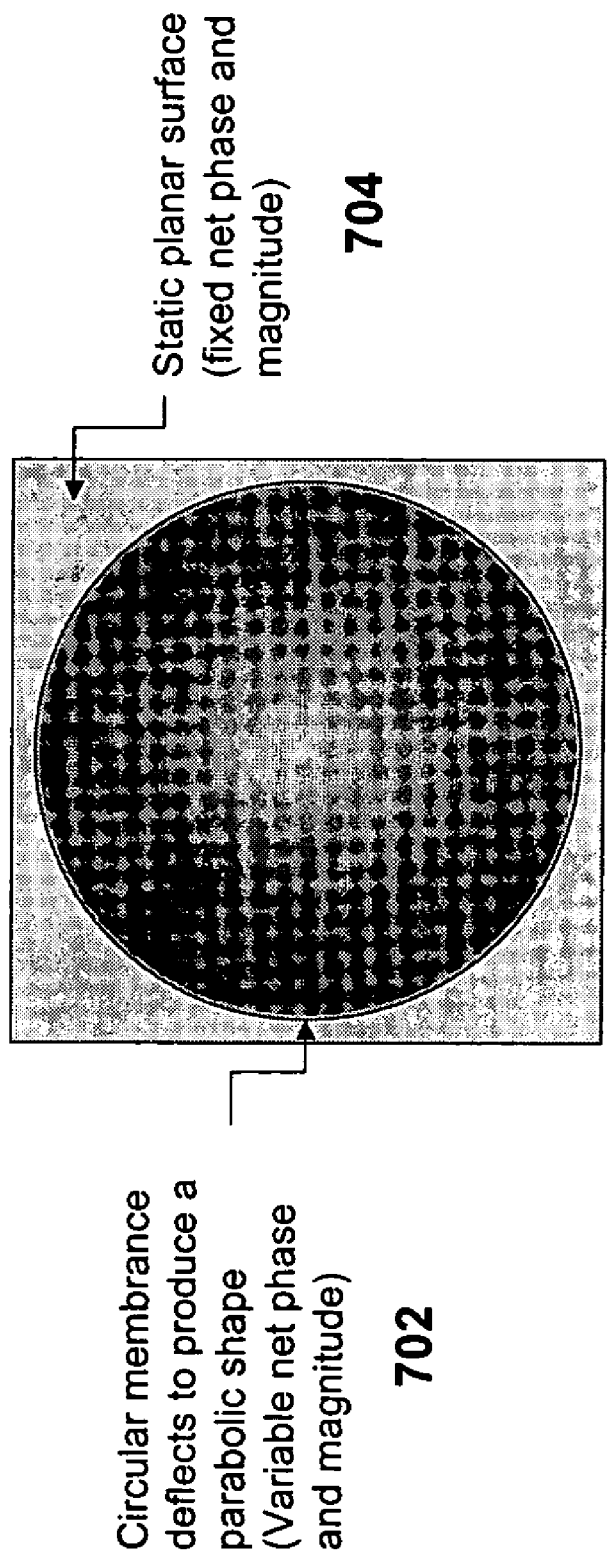
FIG. 7 is a planar top view of a diffractive modulator having a continuously deformable optical surface and a static reflector according to another embodiment of the present invention.

An alternative version or embodiment is shown in FIG. 7, in which the cell further includes a static light reflective surface or static reflector 704 surrounding the deformable surface 702. The static reflector 704 serves to add or subtract from the variable component of the deflecting membrane. Light reflected from the static reflector 704 and the deformable surface 702 interferes with each other to modulate the reflected light from the cell. Such a cell may be configured in an array in one or two dimensions in order to produce an optical modulator array.

It may be appreciated that various properties of the static reflector 704, including separation between the static reflector 704 and the deformable surface 702 may be tailored in order to maximize the performance of the optical modulator.

Figure 8:
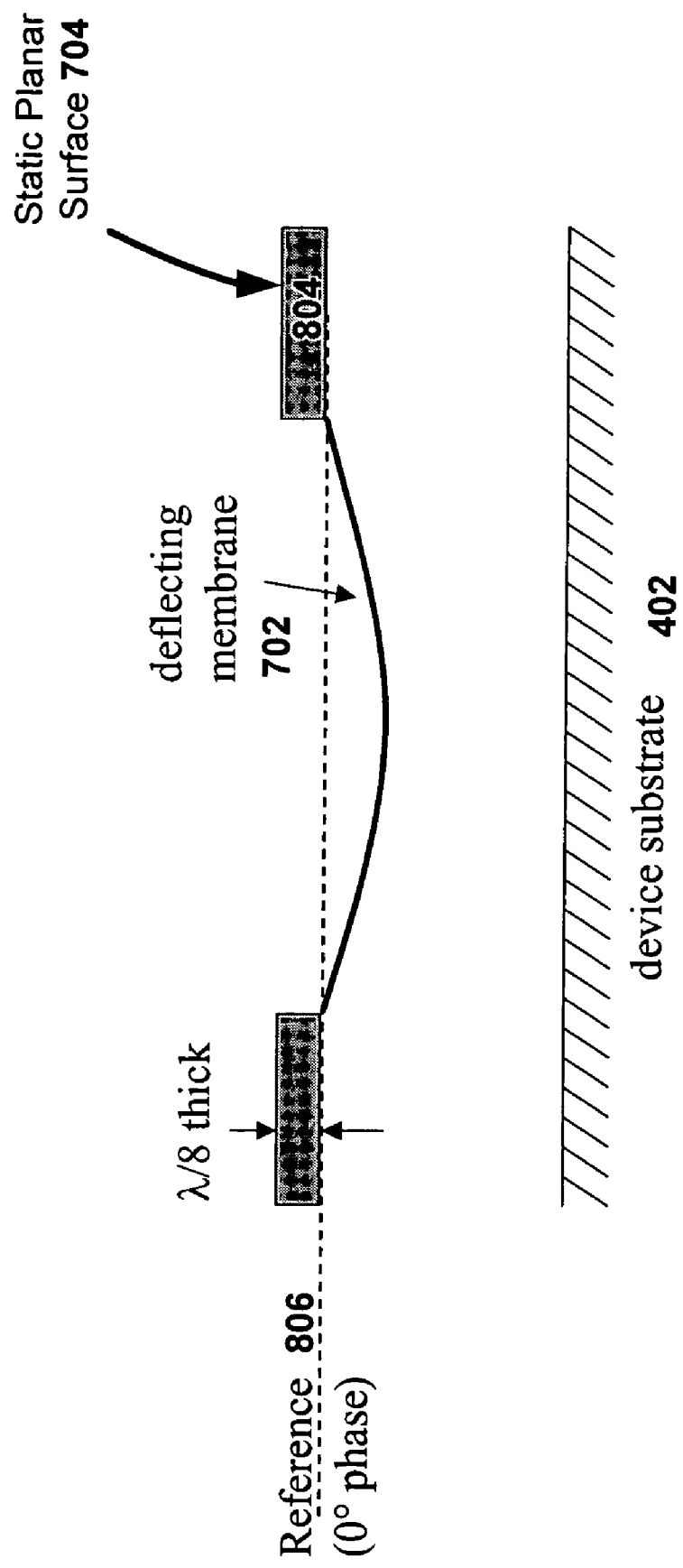
FIG. 8 is a sectional side view of the diffractive modulator of FIG. 7.

In one embodiment the static reflector 704 is separated vertically or in the direction of incidence of the light from the deformable membrane 702 by a distance or height of between 0 and $\lambda/4$, where $\lambda$ is the wavelength of light incident on the modulator. FIG. 7 illustrates the top view, and FIG. 8 shows the device in cross-section. In the example of FIG. 3, a layer 804 of a thickness of $\lambda/8$ is shown as raising the static planar surface 704 above the undeflected vertical reference level 806 of the membrane 702.

Figure 9:
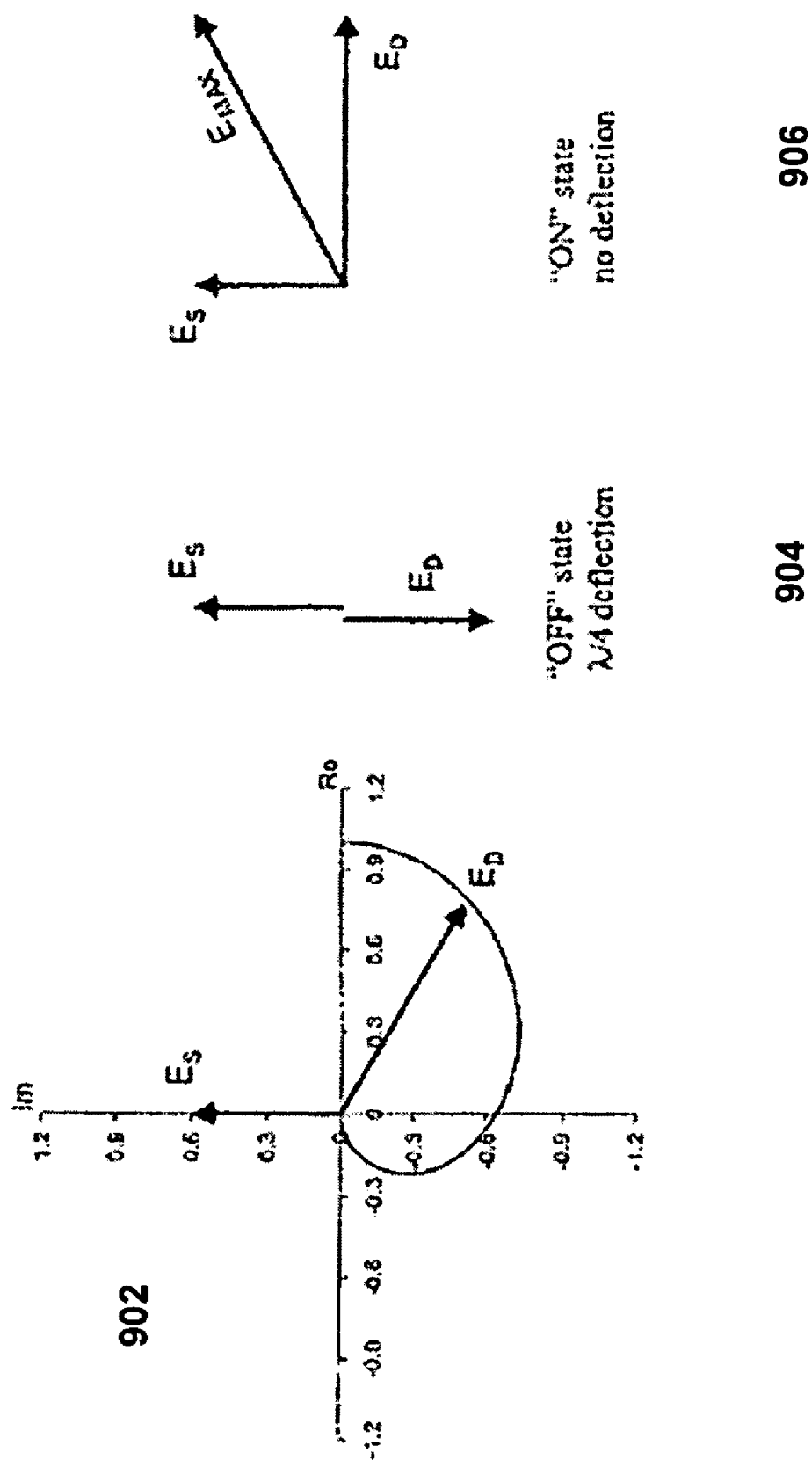
FIG. 9 shows phasor and vector diagrams of the output of the diffractive modulator of FIGS. 7 and 8 illustrating an "on" state wherein the membrane is undeflected and a deflected "off" state according to yet another embodiment of the present invention.

FIG. 9 describes how the device could work to provide both a high efficiency ON state 906, and a null OFF state 904.

Regarding the null state 904, for each single unit of electric field $E_D$ (or area) from the circular membrane 702, then 0.64 units of electric field $E_S$ (or area of the static planar surface 704, given same reflectivity per unit area as the membrane 702) is needed at 90° phase shift (i.e. at $+\lambda/8$ thickness) at the static surface 704 in order to create the null state 904.

Regarding the ON state 906, the maximum electric field $E_{MAX}$ may be calculated to be 1.187 units of field. This maximum reflective state is achieved when the membrane 702 is undeflected. If a similar-sized reflective area (i.e. the entire square) was entirely in phase, then a 1.64 unit electric field would be produced. Thus, since intensity is proportional to the square of the electric field, the diffraction efficiency in $0^{th}$ order is calculated to be $(1.187/1.64)^2=52\%$ of maximum efficiency. Hence, this embodiment has excellent contrast, and approximately half of the theoretical efficiency.

The relative size of the square and the circular membrane can also be calculated and predetermined to maximize the performance of the optical modulator. The ratio of areas in this example is preferably about 0.64:1 (static area:deflecting area) so as to generate the "off" state 904. Thus, if the square cell shown in FIG. 7 was a single unit on a side, then the diameter of the circular membrane 702 would need to be 0.88 units.

Figure 10:
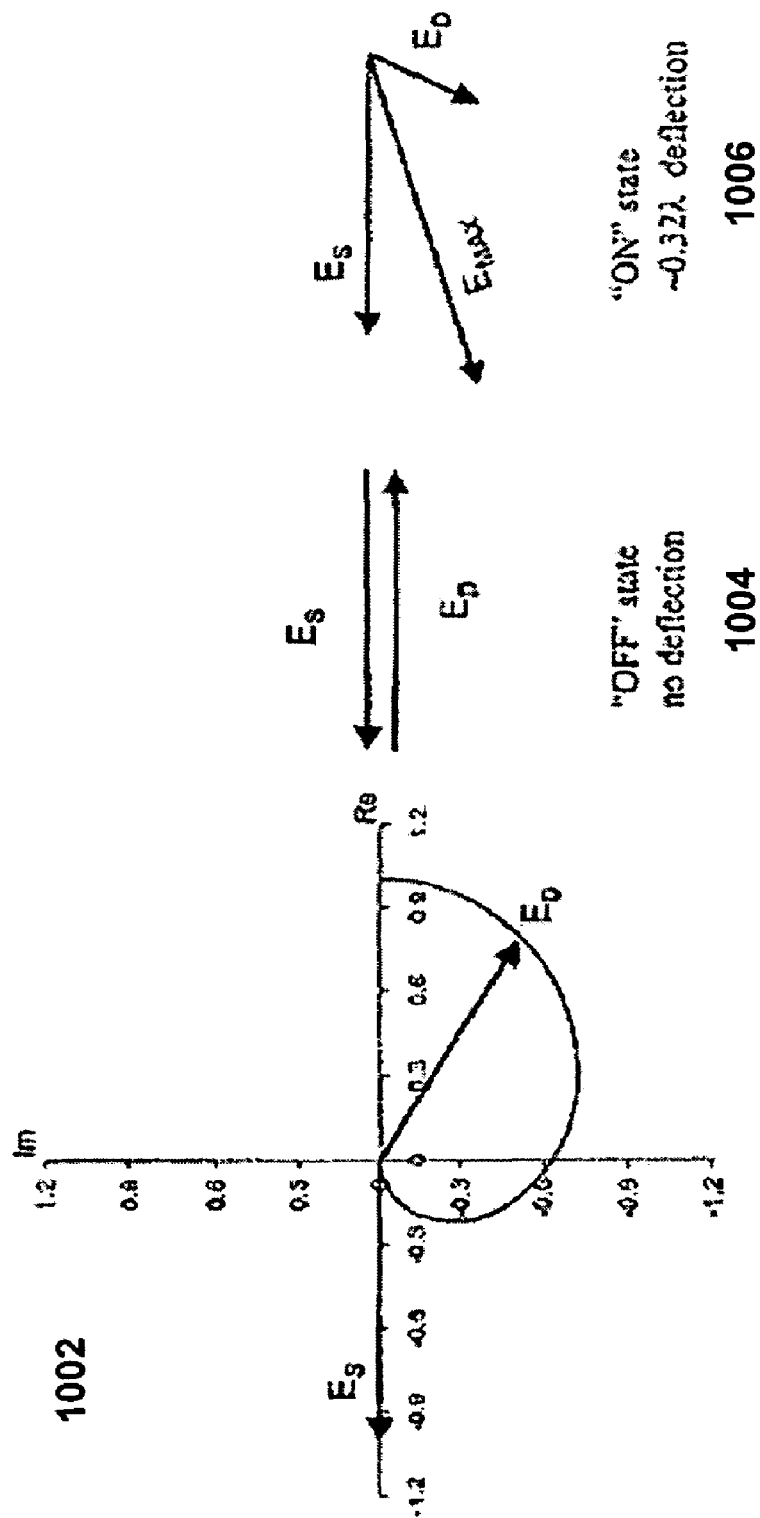
FIG. 10 shows phasor and vector diagrams of the output of the diffractive modulator wherein the membrane and static reflective surface are separated by about λ/4 to provide an "on" state when the membrane is deflected and an undeflected "off" state according to still another embodiment of the present invention.

In another embodiment the static reflector is separated from the deformable membrane by a distance or height of $\lambda/4$. FIG. 10 shows a phasor diagram and describes the vector addition of the output of a diffractive modulator wherein the membrane 702 and static reflector 704 are separated by about $\lambda/4$ (i.e. layer 804 is $\lambda/4$ thick). In this configuration, the reflected light from the static reflector 704 is 180 degrees out-of-phase with respect to the reflected light from the undeflected membrane 702. This configuration may be used to provide an "on" state 1006 when the membrane is deflected and an undeflected "off" state 1004 according to another embodiment of the present invention.

This embodiment is similar to that described above, except the static layer or reflector 704 thickness is now $\lambda/4$. In this case, the null state 1004 is designed to match the zero deflection condition. For this embodiment, the required static field is of $-1$ units (i.e., a thickness of $\lambda/4$), as shown in the phasor diagram 1002.

The maximum electric field summation for the "on" state 1006 occurs at $E_D$ of $\sim(-0.2, -0.4i)$ units. The maximum electric field $E_{MAX}$ is consequently 1.265 units. This compares with a total potential field (for all surfaces in phase) of 2.0 units. Squaring these numbers gives the theoretical efficiency of $(1.265/2.0)=40\%$.

The ratio of areas in this embodiment is preferably 1:1 (static area:deflecting area) so as to be able to generate the "off" state 1004. If the square cell shown in FIG. 7 was a single unit on a side, then the diameter of the circular membrane 702 would need to be 0.80 units. Although this case is not as efficient as the previous embodiment, the ratio of static to membrane area may result in a more practical fabrication.

Figure 11:
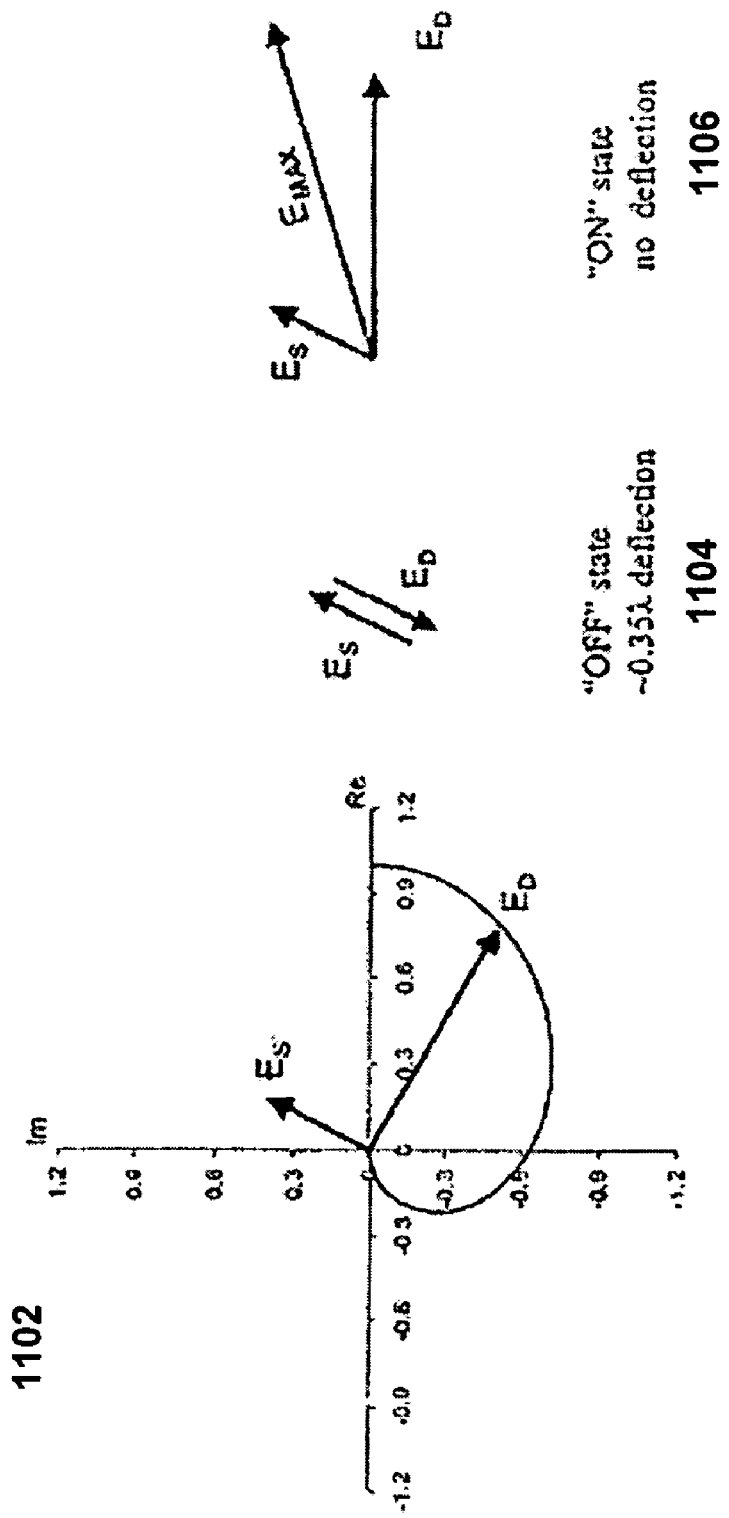
FIG. 11 shows phasor and vector diagrams of the output of the diffractive modulator wherein the membrane and static reflective surface are separated by about 0.072λ to provide an "on" state when the membrane is undeflected according to another embodiment of the present invention.

In yet another embodiment depicted in FIG. 11, the static reflector 704 has a height of about $0.072\lambda$ above the deformable membrane. In this example, as shown in the phasor diagram 1102, the static electric field vector $E_S$ is angled slightly towards the electric field vector $E_D$ of the undeflected state of the deflecting membrane 702 (when $E_D$ is $+1$ on the real axis). Here, the static surface layer 804 has a thickness of 0.072% and an electric field magnitude $E_S$ of 0.35 units (0.22+0.28i).

The maximum electric field $E_{MAX}$ is 1.25 units for the undeflected "on" state 1106. For a center deflection of ~0.35λ, the electric field components are equal and opposite to create the "off" state 1104, giving the required contrast.

The maximum possible electric field for all in phase components is (1.0+0.35)=1.35. Thus the theoretical diffraction efficiency for $0^{th}$ order is $(1.25/1.35)^2$=86%. The ratio of areas in case 3 must be 0.35:1 (static:deflecting). If the square cell shown in FIG. 7 was a single unit on a side, then the diameter of the circular membrane 702 would need to be 0.97 units.

In still another embodiment, shown in FIG. 12, the static reflector is a two-stage static reflector, including both a static reflective surface 1208 separated from the undeflected reference level 1205 of the membrane 1204 by a vertical distance ("d") of λ/8, also known as a 90° phase surface and as described in connection with FIG. 8, and a 0° phase surface 1206 between the 90° phase surface 1208 and the deformable surface 1204, the 0° phase surface 1206 substantially co-planer with the plane 1205 of the deformable surface in a quiescent state.

The previous example, the embodiment described in connection with FIG. 11, has the highest efficiency, but requires very close packing of the circular membranes, and precise control of the static layer height. This situation can be mitigated, by using the 2-stage static reflector of FIG. 12. In particular, FIG. 12 shows how the static reflector may be composed of a "purely Real" and "purely Imaginary" component reflective surfaces. By "purely real" surface, it is meant the 0° surface 1206 at d=0. The "purely imaginary" surface is the 90° surface 1208 at d=λ/8.

Figure 13:
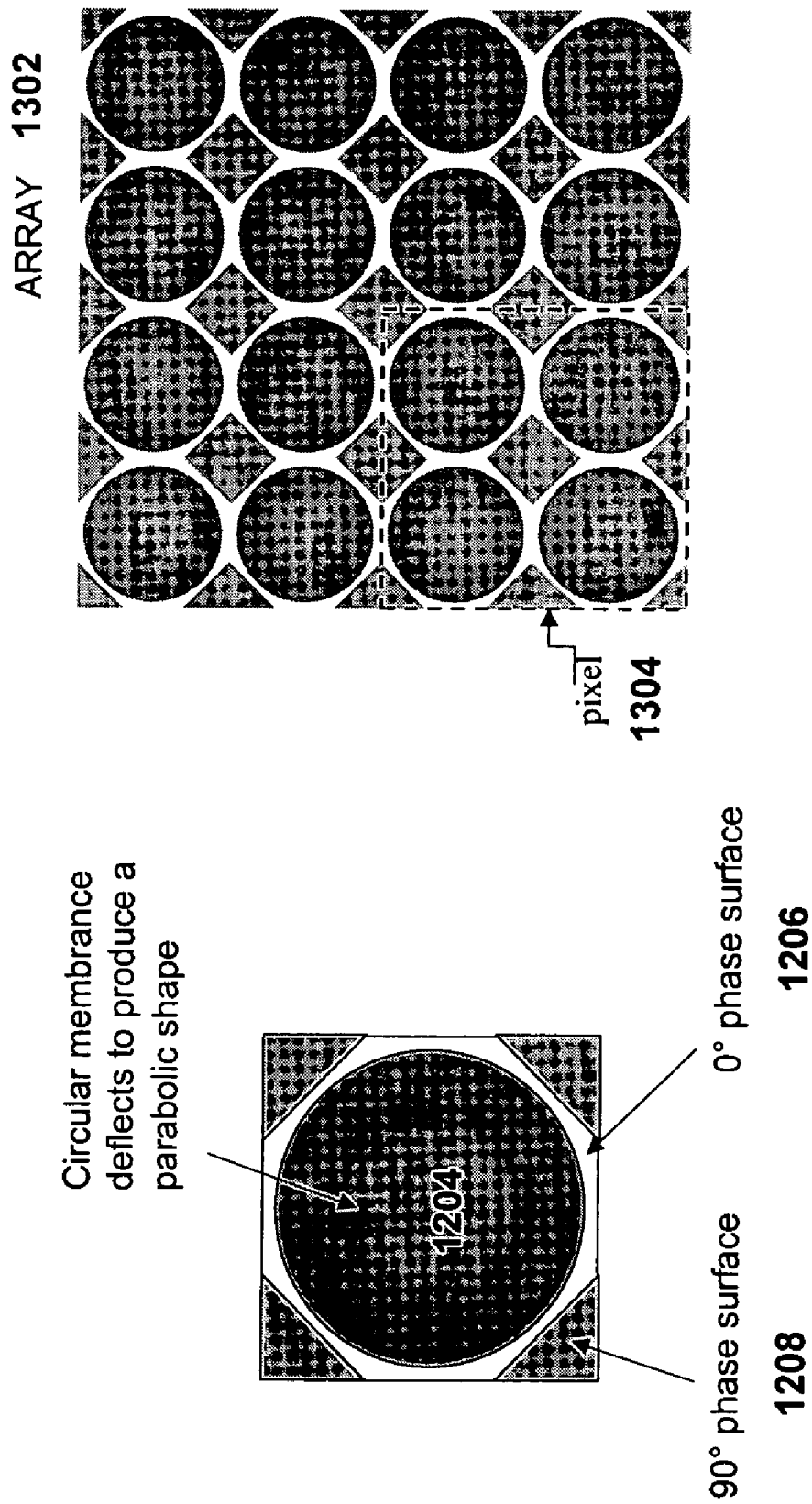
FIG. 13 shows planar top views of a single diffractive modulator of FIG. 12 and an array of a SLM having a number of the diffractive modulators and pixels.

A top (plan) view of such a modulator and an array 1302 of these modulators is shown in FIG. 13.

A single modulator is shown on the left side of FIG. 13. The modulator includes a circular membrane 1204. In one embodiment, the circular membrane 1204 may be deflected to produce a parabolic shape. Circumferentially surrounding the membrane 1204 is a static "0 degree" surface 1206 and a static "90 degrees" surface 1208. These static surfaces form a 2-stage static reflector as discussed above in relation to FIG. 12.

An array 1302 of these modulators is shown on the right side of FIG. 13. As shown, a plurality of the modulators may be controllably grouped together to form a pixel 1304.

Figure 12:
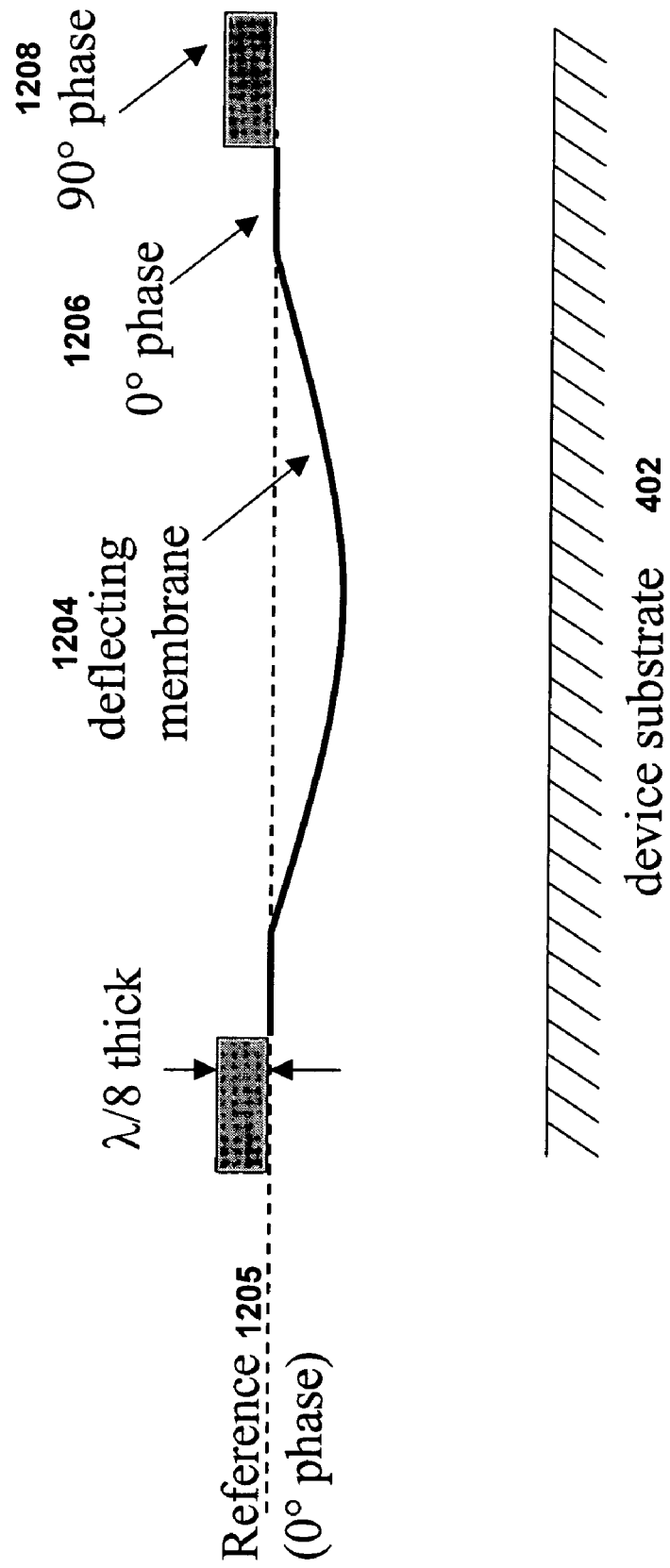
FIG. 12 is a sectional side view of a diffractive modulator having a continuously deformable optical surface and two tier static reflector according to yet another embodiment of the present invention.
Figure 14:
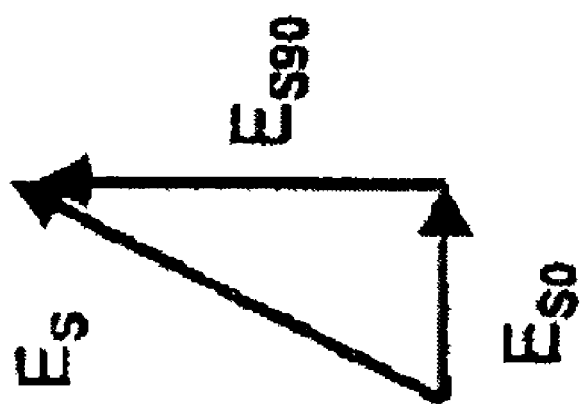
FIG. 14 is a phasor diagram of the output of the pixel of FIG. 13 according to an embodiment of the present invention.

The same magnitude and phase for the static surface may be obtained using the 2-stage static reflector of FIGS. 12 and 13 as was obtained in the immediately preceding embodiment of FIG. 11, except that more area is required for the 2-stage reflector. FIG. 14 is a phasor diagram of the output of the pixel 1304 of FIG. 13 according to an embodiment of the present invention. The net static magnitude required $E_S$ is still 0.35 units, but $E_S$ is composed of fields $E_{S0}$ of 0.22 unit magnitude (due to the "0 degree" reflector surface) and $E_{S90}$ of 0.28 unit magnitude (due to the "90 degree" reflector surface) (see FIG. 14). The total cell area is now (0.22+0.28+1)=1.5 units. The efficiency is thus $(1.25/1.5)^2$=69%.

Figure 15:
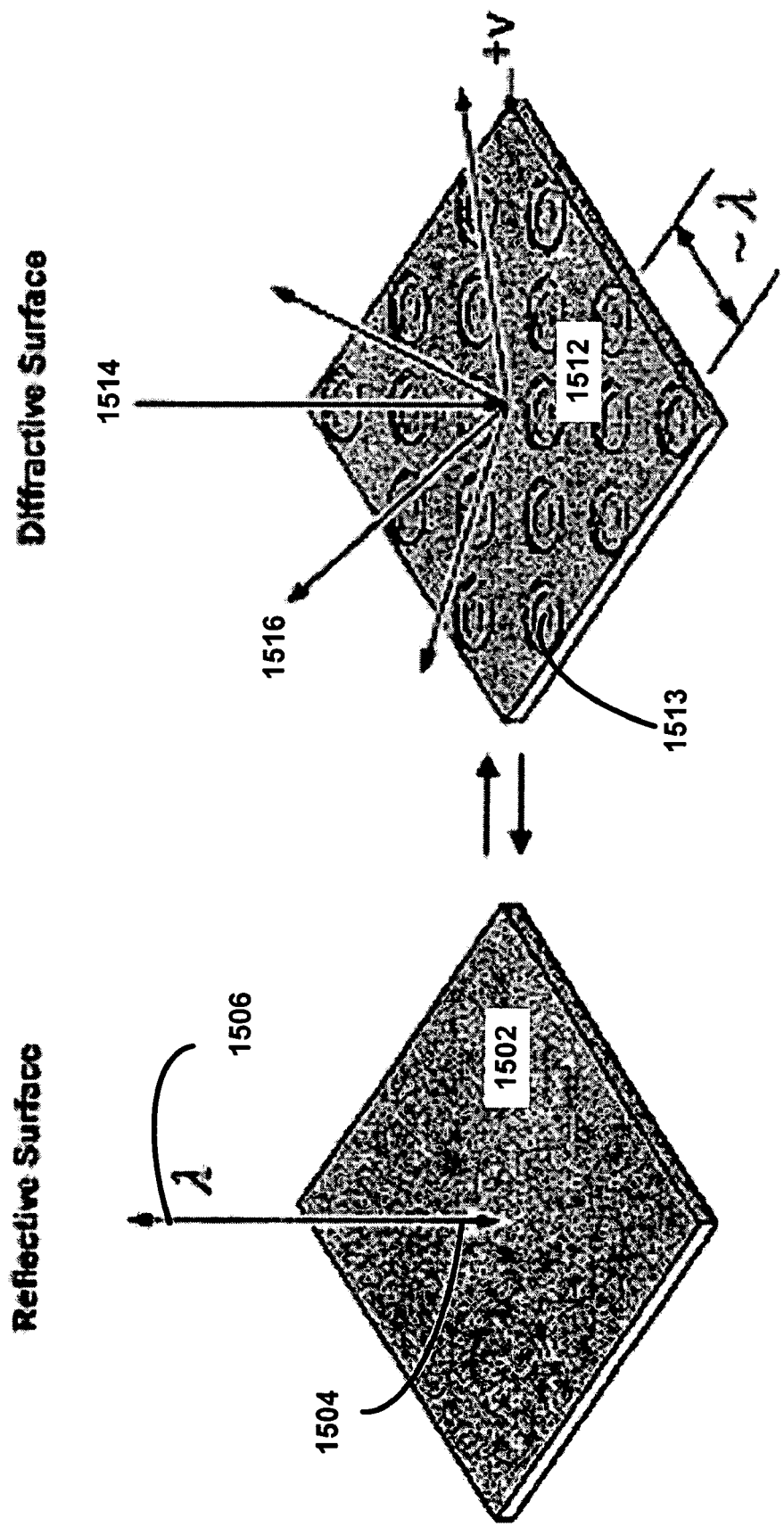
FIG. 15 shows perspective views of a undeflected reflective surface and a deflected diffractive surface of a SLM having a number of the diffractive modulators according to an embodiment of the present invention.

One preferred embodiment of a SLM having an array of diffractive modulators according to the present invention is shown in FIG. 15. FIG. 15 shows perspective views of a undeflected reflective surface 1502 and a deflected diffractive surface 1512 of the SLM. For the undeflective reflective surface 1502, the incident light 1504 of wavelength λ is reflected 1506 by the surface 1502 at a normal or specular angle. For the diffractive surface 1512, circular membranes 1513 in an array with a spacing of λ are shown as deflected therein due to application of voltage +V. As a result, the incident beam 1514 is diffracted 1516 at various angles from the surface.

Figure 16:
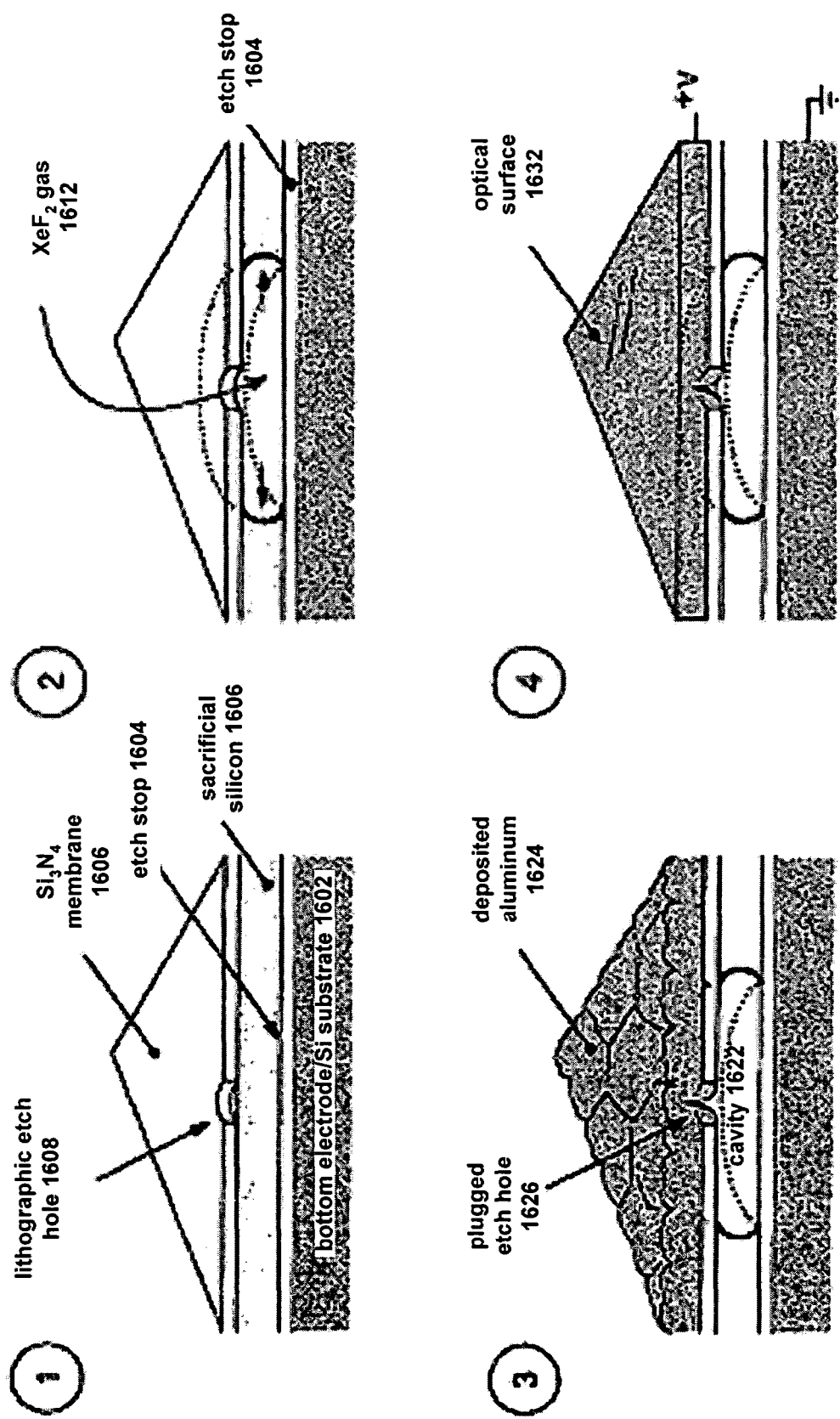
FIG. 16 is a series of sectional side views of a diffractive modulator according to an embodiment of the present invention illustrating a method for manufacturing the same.

An embodiment of a method or process for fabricating a diffractive modulator according to the present invention is now described with reference to FIG. 16. FIG. 16 is a series of sectional side views of a diffractive modulator at different points in an embodiment of a method for manufacturing the same according to the present invention. The process flow illustrated in FIG. 16 assumes a 2D array of integrated drive cells or electrodes have been formed on a substrate 1602, such as a silicon wafer. The steps discussed below highlight how the diffractive modulator is built or fabricated on the upper surface of the substrate 1602.

As shown in the upper left (#1) of FIG. 16, an array of etch holes 1608 is lithographically defined in a $Si_3N_4$ membrane 1606 to expose a portion of an underlying sacrificial silicon layer 1606. Preferably, the sacrificial layer 1606 has a thickness of about 5 times λ/4 to provide a sufficient margin against snap down (of the membrane against the substrate 1602 when the membrane is deflected). Alternatively, different design rules might apply to provide a sacrificial layer 1606 having a different thickness.

As shown in the upper right (#2) of FIG. 16, Xenon Difluoride $XeF_2$ etchant gas 1612 or another appropriate etchant is introduced through the etch holes 1608 for a predetermined time to etch the sacrificial silicon 1606 to the etch stop 1604. This etching defines a cavity 1622 in the sacrificial silicon layer 1612 and releases the deformable reflective surface 1606 lying above the cavity 1622.

As shown in the lower left (#3) of FIG. 16, a reflective material 1624, such as aluminum, is sputtered or otherwise deposited onto the membrane 1606 and, optionally, reflowed to fill 1626 the etch holes 1608 and provide a continuous surface.

As shown in the lower right (#4) of FIG. 16, the reflective material is planarized and polished using, for example, a Chemical Mechanical Polishing (CMP) to provide optical quality reflective surfaces 1632 on the static reflector and deformable surface of the membrane.

Optionally, the method may include additional steps to form a 90° phase surface raised above the plane of the continuously deformable light reflective surface, or two stage static reflector.

The advantages of the diffractive modulator of the present invention over previous or conventional approaches include: (i) elimination of film bowing—because there are no free edges, the tensile film of the membrane generally pulls flat when no electrostatic force is present; (ii) simpler manufacturing—no double sacrificial and/or release layers needed; (iii) multiple layers may easily be incorporated, enabling multi-layer dielectric mirrors; (iv) enabling use of enhanced reflectivity layers (dielectric overcoats); (v) static phasing may be used as a transparent overcoat such as SiN, or $SiO_2$. or other "hard" coating; and (vi) thickness bending resistance may be used instead of tension-dominated membranes.

While the above diffractive modulators have been described in detail as having a parabolic shape, it will be understood by those skilled in the art that many other alternative embodiments and configurations are possible without departing from the spirit and scope of the claimed invention. Although the parabolic shape is a good approximation to membrane deformation in many cases, this work is valid beyond this specific example. In general any deflecting surface can be experimentally characterized to extract a locus of reflected electric field vectors. This extracted data can be used to design an efficient optical modulator in the same manner as has been illustrated herein.

For example, the membrane or diaphragm can further include corrugations to lower tensile stress. These corrugations can fit into the dynamic, deformable surface of the membrane, the static reflector or both. Preferably, the corrugations are formed in a lower surface below the reflective surface.

Figure 17:
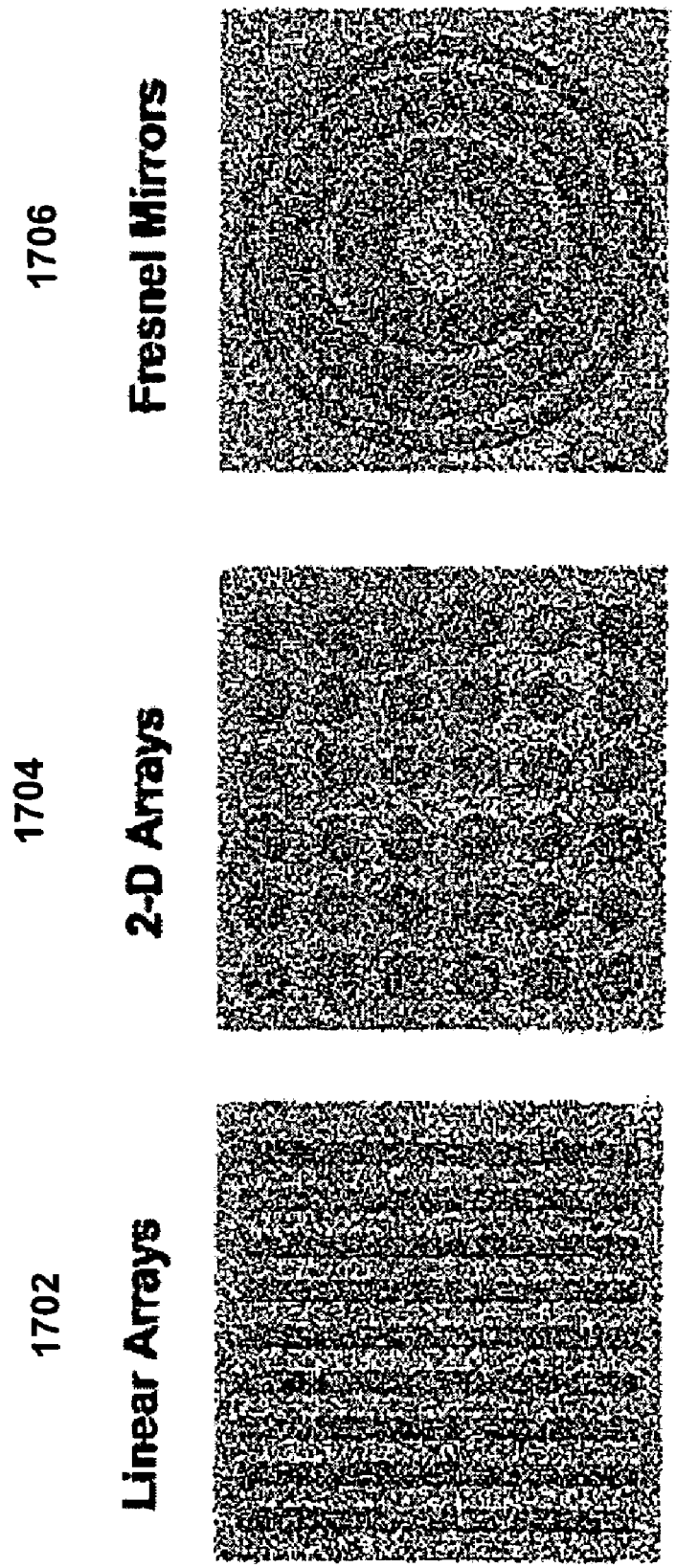
FIG. 17 shows planar top views of SLMs having diffractive modulators arranged to form linear arrays, two-dimensional 2-D arrays and Fresnel Mirrors according to embodiments of the present invention.

A number of other alternative embodiments for diffractors or SLM according to the present invention are shown in FIG. 17. FIG. 17 shows planar top views of SLMs having diffractive modulators arranged to form linear arrays 1702, two-dimensional 2-D arrays 1704 and Fresnel Mirrors 1706.

The foregoing description of specific embodiments and examples of the invention have been presented for the purpose of illustration and description, and although the invention has been described and illustrated by certain of the preceding examples, it is not to be construed as being limited thereby. They are not intended to be exhaustive or to limit the invention to the precise forms disclosed, and many modifications, improvements and variations within the scope of the invention are possible in light of the above teaching. It is intended that the scope of the invention encompass the generic area as herein disclosed, and by the claims appended hereto and their equivalents.

What is claimed is:

1. A diffractive modulator for modulating light incident thereon, the diffractive modulator comprising:
    a substrate having an upper surface;
    a membrane disposed above the upper surface of the substrate and spaced apart in relation thereto, the membrane including a continuously deformable light reflective surface formed on its upper side facing away from the upper surface of the substrate;
    a static light reflective surface surrounding the continuously deformable light reflective surface; and
    circuitry for controllably deflecting the continuously deformable light reflective surface relative to the upper surface of the substrate,
    whereby light reflected from different areas of the continuously deformable light reflective surface and from the static light reflective surface interferes to modulate light reflected from the diffractive modulator, and wherein the static light reflective surface includes a raised portion raised above the plane of the continuously deformable light reflective surface in a quiescent state.

2. The diffractive modulator according to claim 1 wherein the membrane is supported above the upper surface of the substrate by a wall extending substantially entirely around the continuously deformable light reflective surface to define a cavity there beneath, and wherein the static light reflective surface is formed on a portion of the membrane abutting a top surface of the wall.

3. The diffractive modulator according to claim 2 wherein the static light reflective surface and the continuously deformable light reflective surface are sized and shaped to define substantially equal areas.

4. The diffractive modulator according to claim 3 wherein the static light reflective surface is substantially planar.

5. The diffractive modulator according to claim 4 wherein the static light reflective surface circumscribes the continuously deformable light reflective surface to define a parabolic reflector.

6. A diffractive modulator for modulating light incident thereon, the diffractive modulator comprising:
    a substrate having an upper surface;
    a membrane disposed above the upper surface of the substrate and spaced apart in relation thereto, the membrane including a continuously deformable light reflective surface formed on its upper side facing away from the upper surface of the substrate, and the membrane being supported above the upper surface of the substrate by a wall extending substantially around the continuously deformable light reflective surface to define a cavity there beneath;
    a static light reflective surface surrounding the continuously deformable light reflective surface, the static light reflective surface being substantially planar and being formed on a portion of the membrane abutting a top surface of the wall; and
    circuitry for controllably deflecting the continuously deformable light reflective surface relative to the upper surface of the substrate,
    whereby light reflected from different areas of the continuously deformable light reflective surface and from the static light reflective surface interferes to modulate light reflected from the diffractive modulator, wherein the static light reflective surface and the continuously deformable light reflective surface are sized and shaped to define substantially equal areas, and wherein the continuously deformable light reflective surface comprises a plurality of ring shaped regions concentric with and separated by a plurality of ring shaped regions of the static light reflective surface to form a Fresnel mirror.

7. The diffractive modulator according to claim 4 wherein the continuously deformable light reflective surface comprises a plurality of rectangular shaped regions parallel with and separated by a plurality of rectangular shaped regions of the static light reflective surface to form a linear array.

8. A diffractive modulator for modulating light incident thereon, the diffractive modulator comprising:
    a substrate having an upper surface;
    a membrane disposed above the upper surface of the substrate and spaced apart in relation thereto, the membrane including a continuously deformable light reflective surface formed on its upper side facing away from the upper surface of the substrate, and the membrane being supported above the upper surface of the substrate by a wall extending substantially around the continuously deformable light reflective surface to define a cavity there beneath;
    a static light reflective surface surrounding the continuously deformable light reflective surface, the static light reflective surface being substantially planar and being formed on a portion of the membrane abutting a top surface of the wall, the static light reflective surface including a raised portion raised above the plane of the continuously deformable light reflective surface in a quiescent state, wherein the raised portion of the static light reflective surface is separated from the plane of the continuously deformable light reflective surface by a distance, d, between 0 and n times $\lambda/4$, where $\lambda$ is a wavelength of the light incident on the diffractive modulator, where n is an integer equal to or greater than 1; and
    circuitry for controllably deflecting the continuously deformable light reflective surface relative to the upper surface of the substrate,
    whereby light reflected from different areas of the continuously deformable light reflective surface and from the static light reflective surface interferes to modulate light reflected from the diffractive modulator, wherein the static light reflective surface and the continuously deformable light reflective surface are sized and shaped to define substantially equal areas.

9. The diffractive modulator according to claim 8 wherein d is selected to provide a separation between the raised portion of the static light reflective surface and the plane of the continuously deformable light reflective surface in a quiescent state such that the diffractive modulator is in a substantially "OFF" state when the continuously deformable light reflective surface is deflected.

10. The diffractive modulator according to claim 8 wherein d is selected to provide a separation between the raised portion of the static light reflective surface and the plane of the continuously deformable light reflective surface in a quiescent state such that the diffractive modulator is in a substantially "ON" state when the continuously deformable light reflective surface is not deflected.

11. The diffractive modulator according to claim 10 wherein the static light reflective surface further includes a 0° phase surface between the raised portion of the static light reflective surface and the continuously deformable light reflective surface, the 0° phase surface substantially co-planer with the plane of the continuously deformable light reflective surface in a quiescent state.

12. The diffractive modulator according to claim 4 wherein the membrane further includes corrugations to lower tensile stress.

13. A spatial light modulator (SLM) comprising an array of a plurality of diffractive modulators according to claim 4, wherein the SLM further comprises a plurality of pixels, each pixel including at least one of the plurality of diffractive modulators.

14. The diffractive modulator according to claim 1 wherein the means for deflecting the continuously deformable light reflective surface comprises means for applying an electrostatic force between the substrate and the continuously deformable light reflective surface.

\* \* \* \* \*